United States Patent [19]
Carr et al.

[11] Patent Number: 5,214,727
[45] Date of Patent: May 25, 1993

[54] ELECTROSTATIC MICROACTUATOR

[75] Inventors: William N. Carr, Wayne, N.J.; Hsu-Nien Yang, Ping-Tong, Taiwan; Dong-Il D. Cho, Princeton Junction, N.J.

[73] Assignee: The Trustees of Princeton University, Princeton Junction, N.Y.

[21] Appl. No.: 821,962

[22] Filed: Jan. 16, 1992

[51] Int. Cl.$^5$ ............................ G02B 6/00; G02B 6/36
[52] U.S. Cl. ........................................ 385/22; 310/308
[58] Field of Search ...................................... 385/20-24; 310/308, 309

[56] References Cited

U.S. PATENT DOCUMENTS

| | | | |
|---|---|---|---|
| 4,312,561 | 1/1982 | Mead | 385/22 |
| 4,415,229 | 11/1983 | McCullough | 385/22 |
| 4,445,752 | 5/1984 | Faber et al. | 385/22 |
| 4,759,597 | 7/1988 | Lemonde | 385/22 |
| 4,852,962 | 8/1989 | Nicia | 385/22 |
| 4,922,164 | 5/1990 | Jacobsen et al. | 310/309 |
| 5,090,791 | 2/1992 | Kidder et al. | 385/22 X |

OTHER PUBLICATIONS

"The Principal of Electrostatic Linear Actuator Manufactured Silicon Micromachining", Proceedings of the 4th Conf. on Solid-State Sensors & Actuators, Tokyo, Japan, pp. 861-864.

"Microactuators for Aligning Optical Fibers", Sensors and Actuators, vol. 20, pp. 65-73, 1989, Jebens et al.

"Electrostatic Actuators for Micromechatronics", Fujita et al, IEEE Micro Robots and Teleoperators Workshop, 1987, IEEE Catalog No. 87TH0204-8.

Primary Examiner—Akm E. Ullah
Attorney, Agent, or Firm—Perman & Green

[57] ABSTRACT

An electrostatic microactuator for moving an optical fiber is described and includes an actuator plate with opposed major surfaces and interspersed conductive and nonconductive portions. The actuator plate is physically engaged with the optical fiber so that the fiber moves with the actuator. First and second segmented, conductive, torque stators are disposed adjacent the opposed major surfaces of the actuator plate. Multiphase circuitry is connected to segments of the torque stators for applying phased signals thereto to induce a linear actuating force in the actuator plate. The phased signals applied to the first and second torque stators are balanced so as to positionally balance the actuator plate during its travels.

9 Claims, 3 Drawing Sheets

5,214,727

ELECTROSTATIC MICROACTUATOR

FIELD OF THE INVENTION

This invention relates to micromachines, and more particularly, to a linear microactuator that is electrostatically operated to enable coupling of optical fibers.

BACKGROUND OF THE INVENTION

Silicon micromachining has developed over the last decade as a means for accurately fabricating small structures without requiring assembly of discrete components. Such processing generally involves the selective etching of a silicon substrate and depositions of thin film layers of semiconductor materials. Silicon micromachining has recently been applied to the fabrication of both rotary and linear microactuators which exhibit planar geometries and gap separations on the order of 1-2 microns and lateral dimensions on the order of 100 microns or more.

The small sizes of such microactuators and the characteristics of silicon micromachining combine to produce electro-mechanical characteristics significantly different from those of conventional devices. Electrostatic forces are generally found to be larger than the magnetic alternatives for devices scaled to microdimensions. Electrostatic micromotors have a number of advantages over magnetic micromotors or actuators. Static excitation of a magnetic motor requires static currents through its windings, leading to persistent conduction losses. Static excitation of electrostatic motors requires static voltages across gaps, which can be sustained with little loss. An electrostatic motor thus has inherently less losses than a magnetic motor at standstill. This relationship also holds as an electrostatic actuator increases in speed. Electrostatic actuators also avoid the need for magnetizable materials which exhibit eddy current and hysteresis losses.

Recent reports relate the fabrication of a micromotor which includes a rotor and laterally positioned electrostatic stators. Others have also reported on the construction of linear-electrostatic actuators (i.e., see Fujita et al., in "The Principle of Electrostatic Linear Actuator Manufactured Silicon Micromachining", Proceedings of the Fourth Conference on Solid-State Sensors and Actuators, Tokyo, Japan, pages 861-864, 1987 and "Electrostatic Actuators For Micromechatronics", Proceedings of the IEEE MicroRobots and Teleoperators Workshop, 1987. Fujita et al. describe an actuator which includes a plane wafer having embedded strip electrodes and a cylindrical roller extending thereover and aligned therewith. The strip electrodes on one side of the roller are activated by an electric field which tends to attract the roller and make it rotate. As the roller passes over a strip electrode, the electrode is discharged and another in the forward direction is charged to maintain the movement.

A further electrostatic actuator, which is applied to the switching of optical fibers is described by Jebens et al., in "Microactuators For Aligning Optical Fibers" Sensors and Actuators, Vol. 20, pp. 65-73, 1989. In the Jebens et al. actuator, electric fields are used to move a fiber between Vee groove stops. The structure comprises upper and lower plates with Vee grooves, a fiber or fibers, a bias spring and appropriate electrostatic voltage sources. An applied voltage causes a fiber to move into contact with one Vee groove and to remain there so long as the voltage is applied.

It is an object of this invention to provide an improved electrostatic microactuator.

It is another object of this invention to provide an improved electrostatic microactuator which exhibits a plurality of actuating positions that are stable, even in the event of a loss of power.

It is still another object of this invention to provide an electrostatic microactuator that is susceptible to construction in silicon-based technology.

SUMMARY OF THE INVENTION

An electrostatic microactuator for moving an optical fiber is described and includes an actuator plate with opposed major surfaces and interspersed conductive and nonconductive portions. The actuator plate is physically engaged with the optical fiber so that the fiber moves with the actuator. First and second segmented, conductive, torque stators are disposed adjacent the opposed major surfaces of the actuator plate. Multiphase circuitry is connected to segments of the torque stators for applying phased signals thereto to induce a linear actuating force in the actuator plate. The phased signals applied to the first and second torque stators are balanced so as to positionally balance the actuator plate during its travels.

DETAILED DESCRIPTION OF THE INVENTION

Figure 1:
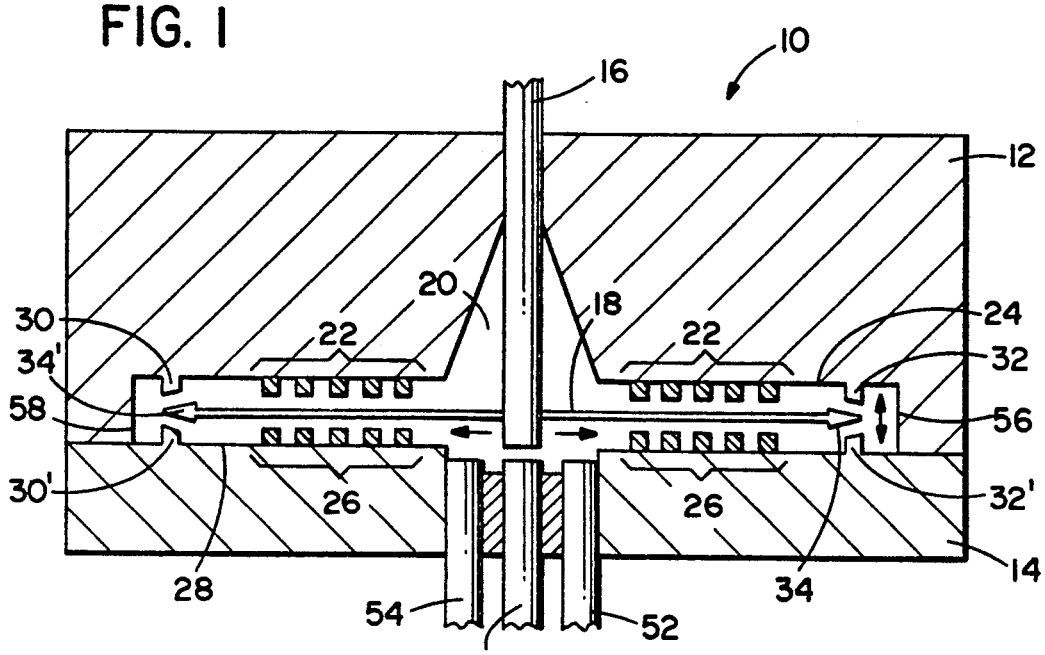
FIG. 1 is a side sectional view of a microactuator incorporating the invention.

Referring now to FIG. 1, microactuator 10 includes upper and lower substrates 12 and 14, respectively. An optical fiber 16 extends through an aperture in upper substrate 12 and is joined to a conductive armature 18. A concave region 20 is formed within upper substrate 12 so that when upper substrate 12 is joined to lower substrate 14, a fully enclosed actuator housing is created. Three optical fibers 50, 52 and 54 communicate with concave region 20 through an opening in lower substrate 14.

A series of electrodes 22 are positioned on surface 24 of upper substrate 12 and form an upper torque stator for microactuator 10. A similar series of electrodes 26 are positioned on surface 28 of lower substrate 14 and provide a lower torque stator for microactuator 10. Pairs of latch finger 30, 30' and 32, 32' extend from surfaces 24 and 28 and provide a latching mechanism for armature 18. At either extremity of armature 18 is positioned a double-sided catch 34.

Figure 2:
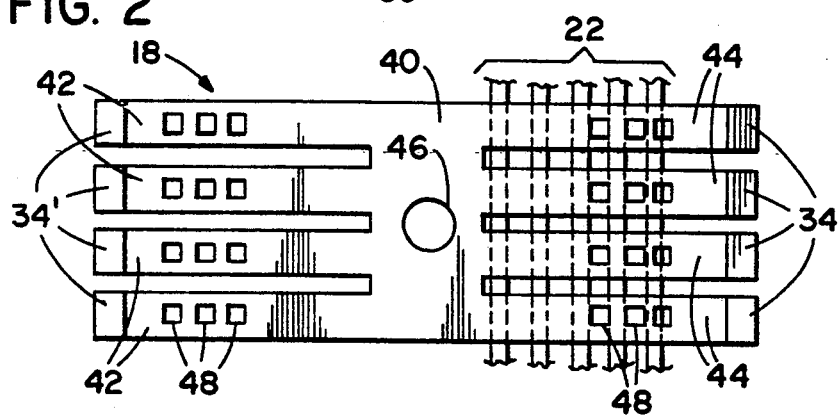
FIG. 2 is a plan view of an armature employed with the microactuator of FIG. 1.

A plan view of armature 18 is illustrated in FIG. 2 and shows its relationship to underlying torque stator electrodes 22. Armature 18 comprises a central portion 40 with armature arms 42 and 44 that extend therefrom. In the view of FIG. 2, four such pairs of armature arms are shown extending from central portion 40. An aperture 46 receives optical fiber 16 and is bonded thereto by an appropriate adhesive. Each of arms 42 and 44 is provided with a plurality of apertures 48 that are positionally aligned across the span of armature arms 42 and 44 respectively. Double-sided catches 34 and 34' are positioned at the distal extremities of each of arms 42 and 44.

Referring now back to FIG. 1, optical fiber 16 is normally aligned with optical fiber 50 so as to enable optical coupling therebetween. When armature 18 is moved to the right, optical fiber 16 aligns with optical fiber 52. The alignment is assured by contact of the distal end of catch 34 against wall 56. Armature 18 is latched in place thereat by engagement between an arm of catch 34 and a latch finger 32 or 32'. In a similar manner, when armature 18 is moved to the left, optical fiber 16 aligns with optical fiber 54. This action is controlled by the engagement of the distal end of catch 34' against wall 58 and a subsequent latching between catch 34' and a latch finger 30 or 30'. When an engaged catch is disengaged from its latching position, optical fiber 16 exerts a self-restoring force which returns armature 18 to an aligned position with optical fiber 50.

As is known to those skilled in the art, a motor or armature structure can be made to move through the use of multiple-phase energizations of a stator winding. A similar scheme is used herein. The circuitry for applying three-phase energization to torque stators 22 and 26 is shown in FIG. 3 and the waveforms used to energize torque stators 22 and 26 are shown in FIG. 4.

The application of three phase energization pulses creates charge distributions on the stator electrode surfaces (i.e., on the surfaces of electrodes 22 and 26.) Those charge distributions create infringing fields that induce physical forces in armature 18. A pulse applied to an electrode creates both an attractive force that tends to pull armature 18 towards the energized electrode and, in addition, induces a horizontal force in armature 18 that extends in the direction of the applied three phase energization. Armature 18 moves in accordance with the induced force; its charge distribution begins to align with that of the torque stator electrodes; and the horizontal force acting on armature 18 thereby diminishes. However, by causing the stator charge pattern to also move (e.g., by a three phase energization thereof) armature 18 is caused to continue its movement in accordance with the applied stator energization, until a catch (e.g. 34 or 34') impacts upon an opposing wall (e.g. 56 or 58). The provision of apertures 48 in armature arms 42 creates discontinuities in the conductivity of each armature arm and enhances the induced forces therein.

It is important that the vertical forces exerted on armature 18 be substantially balanced. Otherwise, armature 18 is drawn into contact with the torque stator that exerts the larger three phase potential It is further desirable that the phase potentials applied to upper torque stator 22 be somewhat greater in amplitude than those applied to lower torque stator 26. As a result, upper torque stator 22 exerts a somewhat greater attractive force on armature 18 and overcomes additional downward forces created by the mass of armature 18. The specific values of applied potentials depends upon the mass of armature 18, the size of each of the electrodes within upper and lower torque stators 22 and 26, the separations between armature 18 and the torque stator surfaces, and the ultimate orientation of the microactuator. Therefore, no fixed values of voltages can be given without a specific design in mind. Nevertheless, one skilled in the art will realize that the ultimate aim is to electrostatically balance armature 18 so that it is equidistantly positioned between torque stators 22 and 26. To latch armature 18 so that a latch finger 30, 30' or 32, 32' or 34 engages a respective catch 34 or 34', all that is required is that the energization applied to one of the torque stators be reduced or removed. The energization applied to the other torque stator creates an attractive force causing armature 18 to bend and cause engagement between one of catches 32 or 34' and a respective latch finger. Due to the self restoring force exerted by optical fiber 16, a force will be exerted by armature 18 against the latch finger to maintain the engagement until equal potentials are again applied to upper and lower torque stators 22 and 26. Such action will cause armature 18 to return its central position.

Figure 3:
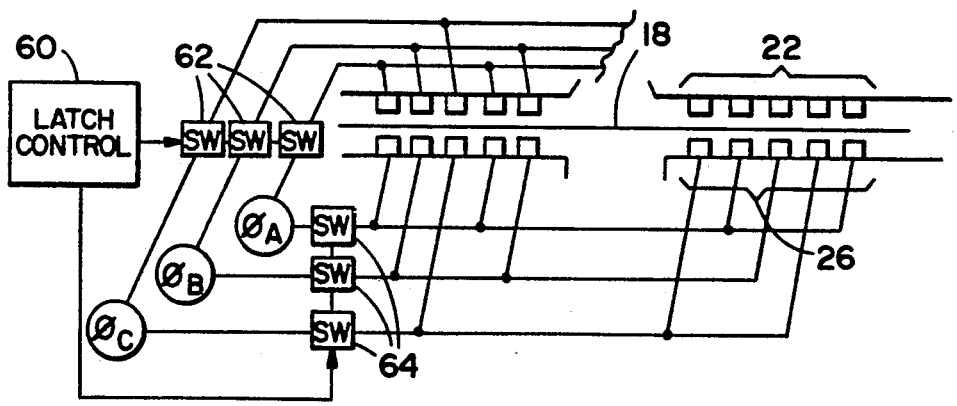
FIG. 3 is a schematic side view of torque stator conductors, showing 3 phase interconnections thereto.
Figure 4:
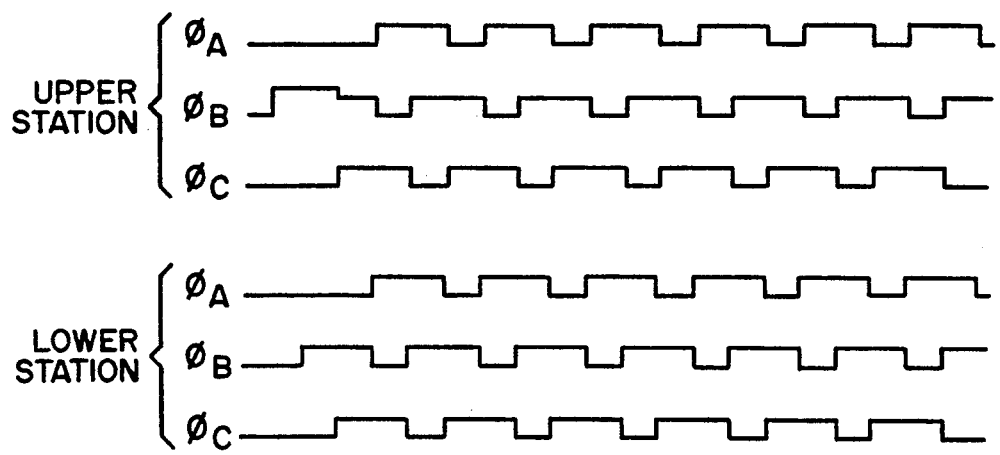
FIG. 4 is a set of wave forms indicating the voltage phases applied to both the upper and lower torque stators.

Referring now to FIG. 3, a circuit schematic is shown that indicates how three phase energization is applied to the electrodes that comprise upper and lower torque stators 22 and 26. As can be seen from FIG. 2, each torque stator comprises a series of parallel-disposed electrodes that are interconnected to phased pulse sources. In FIG. 3, those pulse sources are shown as providing phase A, phase B, and phase C, respectively. As can be seen from the connections shown in FIG. 3, each phase pulse generator is connected to every fourth electrode in both upper and lower torque stators 22 and 26. By applying properly phased pulse signals to the electrodes of upper and lower torque stators 22 and 26, armature 18 can be caused to move in either a rightward or leftward direction, depending upon the phasing of the applied signal. The signal connection shown in FIG. 3 will cause a rightward movement of armature 18 since the phases step from left to right across the electrodes.

In FIG. 4, a set of wave form diagrams illustrate the pulses applied to the upper and lower stators to accomplish a rightward movement of armature 18 in FIG. 3. If it is desired to accomplish a leftward movement, phase A generator is switched in position with phase C generator (by a switching circuit, not shown) and a reverse direction energization can thus be applied to armature 18.

A latch control circuit 60 is enabled to open switches 62 or 64 that connect the respective phase signals to upper and lower torque stators 22 or 26 to thereby unbalance the potentials applied to armature 18 and cause a latching action as above described. As shown, the opening of switches 62 will cause a downward latching action whereas the opening of switches 64 will cause an upward latching action.

Figure 5:
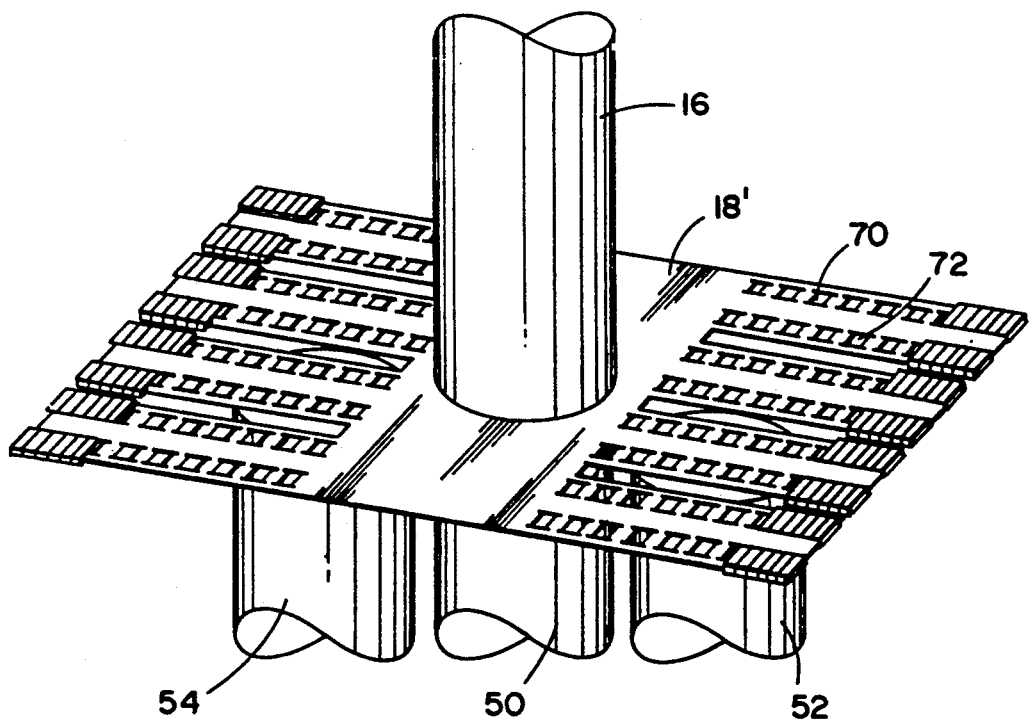
FIG. 5 is a perspective view of an armature showing H-shaped apertures that provide the armature with smoother actuating forces.
Figure 6:
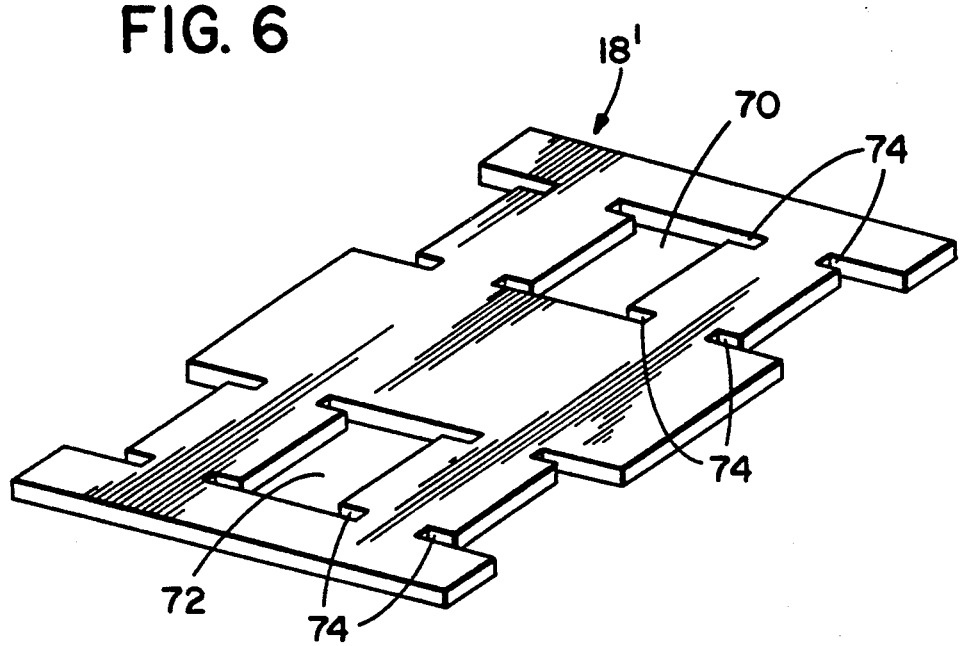
FIG. 6 is a perspective view of a pair of apertures of FIG. 5 showing their H-shape.

Turning now to FIG. 5, a further embodiment of the invention is shown that employs a modified armature 18'. In this case, each arm of actuator 18 is provided with a pair of aligned series of aperture openings 70 and 72. Each aperture opening has an H shape that is shown in further detail in FIG. 6. The "nib" portions 74 of each aperture provide an extended force function on armature 18' and thereby result in a greater overlap of the resultant forces exerted by adjacent apertures. This permits a smoother synchronous movement of armature 18'.

Figure 7:
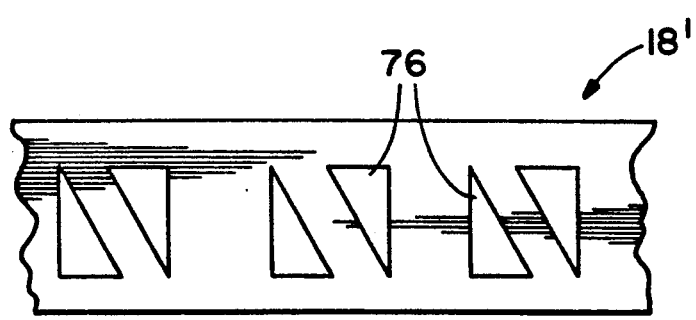
FIG. 7 is a plan view of an armature arm showing triangular shaped apertures formed therein.

Another technique for providing an overlap of force actions on armature 18' is illustrated in FIG. 7. Triangular slots 76 are positioned adjacent each other and are oriented so that adjacent triangular slots have apexes oriented in an opposed fashion. This arrangement of slots causes the plot of forces exerted on armature 18' to flatten and widen for each phase.

As indicated above, the microactuator shown in FIG. 1 is constructed using silicon lithography and etching techniques. Initially, lower substrate is electrically isolated with a sandwich of $Si_3N_4$ over a thermal $S_iO_2$ layer. The lower stator electrodes 26 and the lower part of the latch fingers are formed by patterning a heavily doped CVD polysilicon film. Silicon nitride is deposited between the gaps of the lower stator electrodes, on the upper part of the latch finger, and over the lower surface of upper substrate 12. A CVD oxide layer is then deposited and planarized to form a first sacrificial layer.

Planarization of the oxide layer can be accomplished by a variety of techniques including (reflow of phosphosilicate glass or borophosphosilicate glass; spin-on glass layer; sputter-etching; or plasma-etching after spin-coating with a photoresist. A heavily doped polysilicon layer with holes coated with silicon nitride is fabricated to create the armature and the upper substrate 12 is also defined at this level. After depositing a second sacrificial oxide layer, polysilicon electrodes can be defined over the matching lower stator electrodes and encapsulated by a silicon nitride deposition. The armature is released by etching the oxide layers in hydrofluoric acid to complete the process.

It should be understood that the foregoing description is only illustrative of the invention. Various alternatives and modifications can be devised by those skilled in the art without departing from the invention. For instance, while 3 phase energization of the micro actuator has been described, other phase arrangements that create a similar stator charge movement are acceptable. Accordingly, the present invention is intended to embrace all such alternatives, modifications and variances which fall within the scope of the appended claims.

We claim:

1. An electrostatic microactuator for moving a component comprising:
   actuating means having opposed major surfaces and interspersed conductive and nonconductive portions, said actuating means physically engaged with said component;
   first and second segmented, conductive, torque stators, respectively disposed adjacent said opposed major surfaces of said actuating means; and
   circuit means connected to each segment of each said torque stator for applying phased signals thereto to induce a linear actuating force in said actuating means, phased signals applied to segments of said first torque stator adjusted to balance phased signals applied to segments of said second torque stator, whereby said linear actuating force moves said actuating means and said engaged component, said actuating means electrostatically balanced between said first and second torque stators.

2. The electrostatic microactuator of claim 1, wherein said actuating means is planar in shape and conductive and wherein said nonconductive portions are apertures.

3. The electrostatic microactuator of claim 2, wherein said planar actuating means comprises a plurality of opposed conductive fingers joined at a central portion, each said conductive finger having a plurality of apertures positioned therein.

4. The electrostatic microactuator of claim 3, wherein each said aperture is H-shaped.

5. The electrostatic microactuator of claim 3, wherein each said aperture is triangular in shape, with adjacent apertures having their triangular apexes oppositely disposed.

6. The electrostatic microactuator of claim 2, wherein said component is a first optical fiber, and further comprises:
   a first substrate for supporting said first torque stator, said first substrate having an aperture through which said first optical fiber passes;
   a second substrate for supporting said second torque stator, said second substrate provided with aperture means; and
   a plurality of optical fibers fixedly positioned in said aperture means, whereby movement of said actuating means aligns said first optical fiber with at least one of said fixedly positioned optical fibers.

7. The electrostatic microactuator of claim 6, wherein said first optical fiber exerts a physical self-centering action on said actuating means.

8. The electrostatic microactuator of claim 7, further comprising:
   catch means positioned at extremities of said actuating means;
   latch means for interacting with said catch means; and
   means for unbalancing signals applied to said first and second torque stators to create a flexure of said actuating means and an engagement between a catch means and a latch means that results in a latching action when said actuating means is moved to a latching position.

9. The electrostatic microactuator as recited in claim 8, wherein said substrate is provided with an abutting wall against which said actuating means is moved, the position of said abutting wall defining a latching position.

* * * * *